(12) United States Patent
Hamaker et al.

(10) Patent No.: US 9,069,767 B1
(45) Date of Patent: Jun. 30, 2015

(54) ALIGNING CONTENT ITEMS TO IDENTIFY DIFFERENCES

(75) Inventors: Janna Hamaker, Issaquah, WA (US);
Tom Killalea, Seattle, WA (US);
Christopher F. Weight, Seattle, WA (US); Bruno A. Posokhow, Menlo Park, CA (US); Daniel B. Rausch, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/050,829

(22) Filed: Mar. 17, 2011

Related U.S. Application Data

(60) Provisional application No. 61/427,682, filed on Dec. 28, 2010.

(51) Int. Cl.
*G06F 17/30* (2006.01)

(52) U.S. Cl.
CPC .............................. *G06F 17/30011* (2013.01)

(58) Field of Classification Search
USPC ......................................................... 707/756
See application file for complete search history.

(56) References Cited

U.S. PATENT DOCUMENTS

| | | | |
|---|---|---|---|
| 4,884,974 A | 12/1989 | DeSmet | |
| 5,166,664 A | 11/1992 | Fish | |
| 5,802,204 A | 9/1998 | Basehore | |
| 5,907,845 A | 5/1999 | Cox et al. | |
| 5,960,464 A | 9/1999 | Lam | |
| 5,986,690 A | 11/1999 | Hendricks | |
| 6,047,093 A | 4/2000 | Lopresti et al. | |
| 6,074,093 A | 6/2000 | Anderson | |
| 6,108,688 A | 8/2000 | Nielsen | |
| 6,138,129 A | 10/2000 | Combs | |
| 6,173,251 B1 | 1/2001 | Ito et al. | |
| 6,218,982 B1 | 4/2001 | Shirai et al. | |
| 6,377,945 B1 | 4/2002 | Risvik | |
| 6,622,624 B1 | 9/2003 | Divine et al. | |
| 6,658,626 B1 | 12/2003 | Aiken | |
| 6,704,733 B2 | 3/2004 | Clark et al. | |
| 6,898,307 B1 | 5/2005 | Harrington | |
| 7,020,654 B1 | 3/2006 | Najmi | |
| 7,020,663 B2 | 3/2006 | Hay et al. | |
| 7,028,258 B1 | 4/2006 | Thacker et al. | |
| 7,702,655 B1 | 4/2010 | Panelli et al. | |
| 7,823,127 B2 | 10/2010 | Zeidman | |
| 8,250,065 B1 | 8/2012 | Chambers et al. | |
| 8,266,115 B1 | 9/2012 | Park et al. | |
| 8,280,640 B2 | 10/2012 | Levin et al. | |
| 8,316,032 B1 * | 11/2012 | Baluja et al. | .................. 707/749 |

(Continued)

OTHER PUBLICATIONS

Office action for U.S. Appl. No. 13/048,426, mailed on Apr. 1, 2013, Weight et al., "Identifying Book Title Sets", 23 pages.

(Continued)

*Primary Examiner* — Shyue Jiunn Hwa
(74) *Attorney, Agent, or Firm* — Lee & Hayes, PLLC

(57) ABSTRACT

Techniques for aligning content items with one another are described herein. These techniques may align different versions of a same content item for the purpose of identifying differences between the versions, identifying commonalities between the versions, mapping annotations made in one version to the other version, aggregating annotations across the different versions, or for any other reason. The content items may include electronic books, songs, videos, documents, or the like.

28 Claims, 6 Drawing Sheets

(56) References Cited

U.S. PATENT DOCUMENTS

| | | |
|---|---|---|
| 8,495,061 B1 | 7/2013 | Lifantsev |
| 8,510,312 B1 | 8/2013 | Thibaux et al. |
| 2002/0021838 A1 | 2/2002 | Richardson et al. |
| 2002/0049781 A1 | 4/2002 | Bengtson |
| 2002/0091584 A1 | 7/2002 | Clark et al. |
| 2002/0107735 A1 | 8/2002 | Henkin et al. |
| 2002/0123994 A1 | 9/2002 | Schabes et al. |
| 2003/0032010 A1* | 2/2003 | Selifonov et al. ............ 435/6 |
| 2003/0093427 A1* | 5/2003 | Hsu et al. .................. 707/10 |
| 2003/0103238 A1 | 6/2003 | MacLean et al. |
| 2004/0068471 A1 | 4/2004 | Kato |
| 2004/0088165 A1 | 5/2004 | Okutani et al. |
| 2004/0205540 A1 | 10/2004 | Vulpe et al. |
| 2004/0218205 A1 | 11/2004 | Irwin et al. |
| 2005/0060273 A1 | 3/2005 | Andersen et al. |
| 2005/0096938 A1 | 5/2005 | Slomkowski et al. |
| 2005/0097007 A1 | 5/2005 | Alger et al. |
| 2005/0131932 A1 | 6/2005 | Weare |
| 2005/0138551 A1 | 6/2005 | Elazar et al. |
| 2005/0190397 A1 | 9/2005 | Ferlitsch |
| 2005/0192955 A1 | 9/2005 | Farrell |
| 2005/0196074 A1 | 9/2005 | Deere |
| 2005/0198070 A1 | 9/2005 | Lowry |
| 2005/0209989 A1 | 9/2005 | Albornoz et al. |
| 2006/0036593 A1 | 2/2006 | Dean et al. |
| 2006/0036934 A1 | 2/2006 | Fujiwara |
| 2006/0150096 A1 | 7/2006 | Thacker et al. |
| 2006/0156226 A1 | 7/2006 | Dejean et al. |
| 2006/0173818 A1 | 8/2006 | Berstis et al. |
| 2006/0262340 A1 | 11/2006 | Lee |
| 2006/0277167 A1 | 12/2006 | Gross et al. |
| 2007/0061582 A1 | 3/2007 | Ohmori et al. |
| 2007/0150443 A1* | 6/2007 | Bergholz et al. .................. 707/3 |
| 2007/0196015 A1* | 8/2007 | Meunier et al. ............... 382/190 |
| 2007/0217692 A1 | 9/2007 | Newcomer et al. |
| 2007/0217715 A1 | 9/2007 | Newcomer et al. |
| 2007/0274704 A1 | 11/2007 | Nakajima et al. |
| 2007/0280072 A1 | 12/2007 | Hsieh et al. |
| 2007/0286465 A1 | 12/2007 | Takahashi et al. |
| 2008/0019430 A1 | 1/2008 | Suzuki et al. |
| 2008/0077570 A1 | 3/2008 | Tang et al. |
| 2008/0114757 A1 | 5/2008 | Dejean et al. |
| 2008/0126335 A1 | 5/2008 | Gandhi et al. |
| 2008/0154943 A1 | 6/2008 | Dreyer et al. |
| 2008/0163039 A1 | 7/2008 | Ryan et al. |
| 2008/0209314 A1 | 8/2008 | Sylthe et al. |
| 2008/0229182 A1 | 9/2008 | Hendricks et al. |
| 2008/0275871 A1 | 11/2008 | Berstis et al. |
| 2008/0294453 A1 | 11/2008 | Baird-Smith et al. |
| 2009/0012984 A1 | 1/2009 | Ravid et al. |
| 2009/0027419 A1 | 1/2009 | Kondo et al. |
| 2009/0049026 A1 | 2/2009 | Ohguro |
| 2009/0063557 A1* | 3/2009 | MacPherson ............. 707/103 R |
| 2009/0144277 A1 | 6/2009 | Trutner et al. |
| 2009/0164312 A1 | 6/2009 | Nadig |
| 2009/0182728 A1 | 7/2009 | Anderson |
| 2009/0204893 A1 | 8/2009 | Nguyen et al. |
| 2009/0241054 A1 | 9/2009 | Hendricks |
| 2009/0254810 A1 | 10/2009 | Mitsui |
| 2009/0265321 A1* | 10/2009 | Grubb et al. ...................... 707/3 |
| 2009/0310408 A1 | 12/2009 | Lee et al. |
| 2009/0313539 A1 | 12/2009 | Ota et al. |
| 2009/0324096 A1 | 12/2009 | Megawa |
| 2010/0114827 A1 | 5/2010 | Pearce |
| 2010/0166309 A1 | 7/2010 | Hull et al. |
| 2010/0198864 A1 | 8/2010 | Ravid et al. |
| 2010/0220216 A1 | 9/2010 | Fishman et al. |
| 2010/0251089 A1 | 9/2010 | Cole et al. |
| 2010/0262454 A1* | 10/2010 | Sommer et al. ................. 705/10 |
| 2011/0078152 A1 | 3/2011 | Forman et al. |
| 2011/0119240 A1* | 5/2011 | Shapira ........................ 707/693 |
| 2011/0153330 A1 | 6/2011 | Yazdani et al. |
| 2012/0036431 A1 | 2/2012 | Ito et al. |
| 2012/0121195 A1 | 5/2012 | Yadid et al. |
| 2012/0198330 A1 | 8/2012 | Koppel et al. |
| 2014/0298167 A1 | 10/2014 | Jones et al. |

OTHER PUBLICATIONS

Office action for U.S. Appl. No. 12/979,971, mailed on Apr. 18, 2013, Jones et al., "Electronic Book Pagination", 30 pages.

Office action for U.S. Appl. No. 12/979,971, mailed on Aug. 8, 2013, Jones et al., "Electronic Book Pagination", 32 pages.

Office action for U.S. Appl. No. 12/980,015, mailed on Sep. 10, 2013, Weight et al., "Book Version Mapping", 27 pages.

Wikipedia, "Lookuptable", at http://en.wikipedia.org/w/index.php?title=Lookuptable&oldid_333018082, retrieved on Aug. 2, 2013, 2009, 7 pages.

Wikipedia, "Metadata", at http://en.wikipedia.org/w/index.php?title=Metadata&oldid=333583065, retrieved on Aug. 2, 2013, 2009, 17 pages.

Office action for U.S. Appl. No. 13/048,426, mailed on Nov. 18, 2013, Weight, et al., "Identifying Book Title Sets", 18 pages.

Office Action for U.S. Appl. No. 12/979,971, mailed on Dec. 6, 2013, Derek T. Jones, "Electronic Book Pagination", 13 pages.

Final Office Action for U.S. Appl. No. 12/980,015, mailed on May 9, 2014, Christopher F. Weight, "Book Version Mapping", 30 pages.

Office action for U.S. Appl. No. 13/048,426, mailed on Jun. 19, 2014, Weight et al., "Identifying Book Title Sets", 23 pages.

* cited by examiner

ALIGNING CONTENT ITEMS TO IDENTIFY DIFFERENCES

PRIORITY

This application is a continuation of and claims priority to pending U.S. Provisional Patent Application 61/427,682 filed Dec. 28, 2010 and titled "Aligning Content Items to Identify Differences", which is herein incorporated by reference in its entirety.

BACKGROUND

Locations within books have traditionally been indicated by page and line numbers. However, the concept of a "page" is not as meaningful in the context of electronic books, in which page divisions may be calculated dynamically, as a function of page and font size. Different book reader devices have different display sizes, and even within a particular device, a user may change viewing options to result in different effective page sizes.

Because of this, locations within electronic books are often specified in terms of an index that relates to a smaller unit of measure, such as by a byte/character index or a word index. For example, a particular word might be specified in terms of its starting and ending character indexes, relative to the beginning of the electronic book.

A further complication arises when dealing with multiple versions of an electronic book. When publishing electronically, revisions are very easy to implement, and publishers often submit new versions to correct relatively minor things such as typographical errors, as well as to make more significant revisions. Even small changes between versions can disrupt a position indexing scheme, making it difficult to correlate locations within versions. However, identifying even these small changes between different versions of an electronic book can be difficult.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
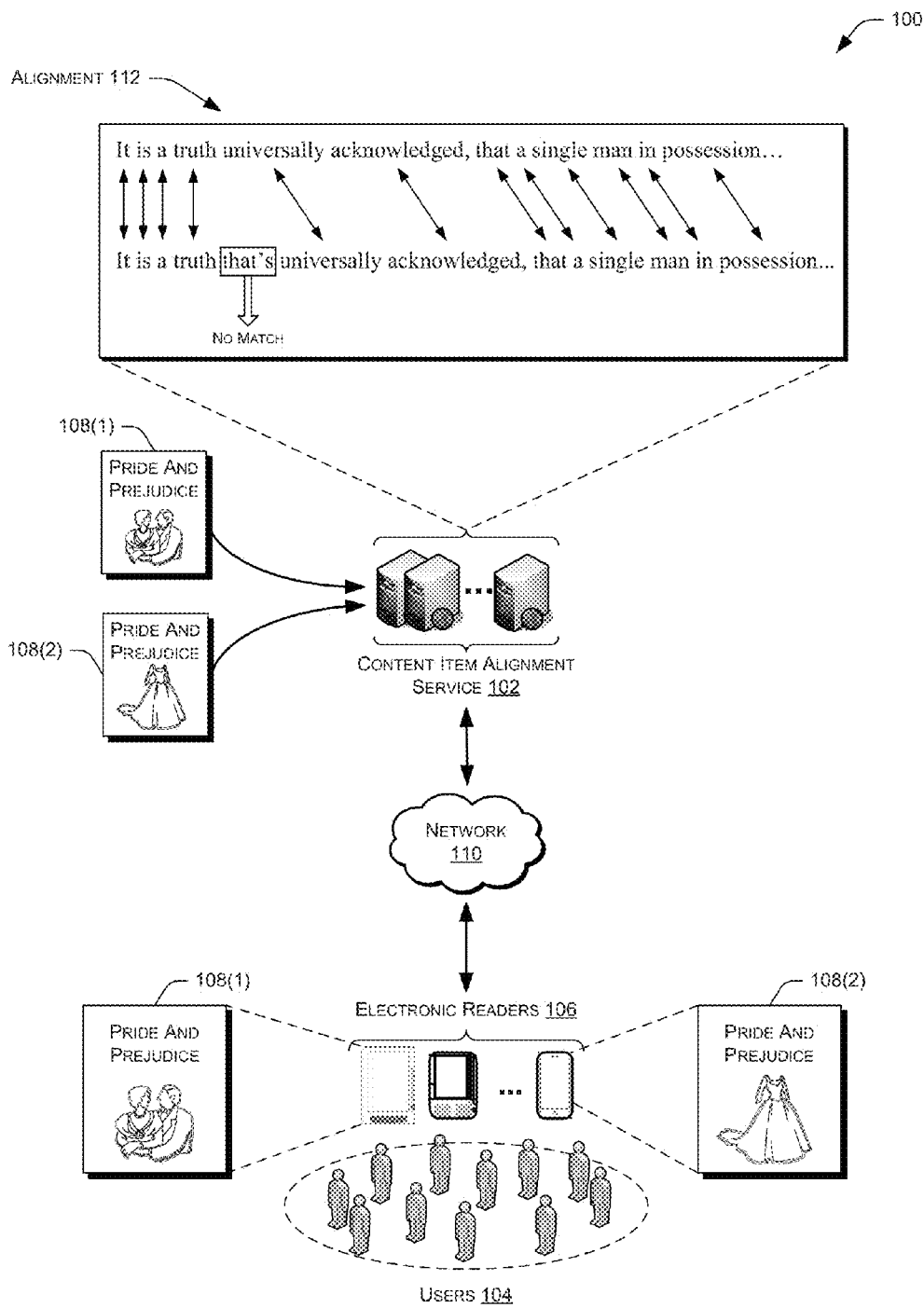
FIG. 1 illustrates an example architecture in which a content item alignment service attempts to align the contents of two different versions of a same electronic book to identify differences between the versions.

This disclosure describes systems, devices, and processes (collectively "techniques") for aligning content items with one another. For instance, the techniques may align different versions of a same content item for the purpose of identifying differences between the versions, identifying commonalities between the versions, mapping annotations made in one version to the other version, aggregating annotations across the different versions, or for any other reason. The content items may include electronic books, songs, videos, documents, or the like.

In one example, the techniques may first determine an overall similarity between two (or more) differing content items to determine whether the content items are sufficiently similar to make an attempt to align the content items worthwhile. For instance, the techniques may compare a determined overall similarity between two content items to a predefined threshold. If the overall similarity is less than the threshold, then the content items may be deemed dissimilar to one another and no attempt may be made to align the items. If, however, the similarity is greater than the threshold, then the techniques may attempt to align the content items.

In some instances, meanwhile, the techniques may identify sections of two differing content items that are generally similar and, in response, may attempt to align these sections while refraining from attempting to align the remainder of the items. For instance, two different versions of a particular electronic book may have entirely different forewords before proceeding onto the actual content of the story. As such, the techniques may attempt to align the actual content of the story (e.g., the chapters of the book) while refraining from attempting to align the forewords, given that they are entirely different from one another.

The techniques may identify the substantive content of the electronic book (e.g., the content after the foreword and/or other "front" or "back" matter) in any number of ways. For instance, the electronic book may mark where the first chapter of the story begins. Conversely, the techniques may identify a corresponding statistically improbable phrase (SIP) in each version of the electronic book and then may attempt to align these versions forwards and/or backwards from the common SIP. Of course, while a few examples have been listed, the techniques may work off of a common location between the two electronic books or other content items in any other number of ways.

To align the items in any of the manners described above, the techniques may first select portions from each of the content items to compare with one another. These portions may be of equal size, such as the same number of words in an electronic book, a same amount of time in a song, or the like. Further, these portions may correspond to one another in location. For instance, the first one hundred words of a first electronic book may be selected for comparison to the first one hundred words of the second electronic book. In addition, the size of the portions (e.g., 100 words) may be based at least partly on the overall similarity between the items, with size being inversely proportional to the similarities in some examples.

After selecting the portions for comparisons, any number of algorithms may be utilized in an attempt to align the portions with one another. For instance, the techniques may utilize the Needleman-Wunsch algorithm (an example of a global alignment algorithm), the Smith-Waterman algorithm (an example of a local alignment algorithm), or the like, some or all of which may utilize edit distances (e.g., a Levenshtein distance).

After determining the alignment, the techniques may compare this alignment to an alignment threshold. If the alignment is less than the threshold, then new portions may be selected. In some instances, these new portions may include the previously-selected portions in addition to new content. For instance, in the example of comparing the first 100 words from two different versions of an electronic book, the techniques may proceed to select and attempt to align the first 200 words of the different versions of the book. The techniques may continue to select new portions (e.g., by expanding the portions) until an alignment there between is greater than the alignment threshold or until a predetermined number of iterations have been exhausted and the content items are deemed dissimilar from one another.

When the alignment similarity is greater than the alignment threshold, meanwhile, the techniques may proceed to identify differences and/or commonalities within the portions of the content items. For instance, in the example of comparing text (e.g., from two different versions of an electronic book, a song, a video, or the like) the techniques may attempt to match each word within the two portions. That is, in the electronic book example, the first word of the portion of the first version may be matched to the first word of the portion from the second version, and so on. The techniques may log any instances where a word in one version does not find a corresponding match in the other version. In some instances, the techniques may disregard certain types of words or symbols when identifying differences between versions. For instance, the techniques may identify prices of items or ratings of items between different versions, since these pricings or ratings may change between versions even though the general content may stay the same. Furthermore, the techniques may disregard any other type of predefined content that changes between versions in some instances.

Further, after the selected alignment between the portions is determined to be greater than the alignment threshold, the techniques may proceed to match discrete pieces of the content items that are subsequent to the aligned portions. For instance, after aligning the first 100 words of the first version of the electronic book with the first 100 words of the second version, the techniques may begin performing word-to-word matching of the $101^{st}$ words of the books, the $102^{nd}$ words, and so on. When a mismatch is found (or when a threshold number of mismatches is found), then the techniques may identify the difference(s) and may again select and attempt to align a portion of the content items (e.g., 100 words) as described above.

Upon completion of the alignment of the content items, the techniques may have successfully identified differences between the items. As described above, this may aid in mapping annotations between the items, identifying updates made in a subsequent version of a content item, aggregating annotations over multiple versions of a content item, and so on.

The claimed techniques are described below with reference to an example architecture. However, it is to be appreciated that a number of other architectures may also employ these techniques.

Example Architecture

FIG. 1 shows an example environment 100 in which a content item alignment service 102 attempts to align two or more content items with one another. For instance, the service 102 may align two or more versions of a book, song, video, document, or the like to identify changes there between. The content item alignment service 102 may also offer the content items to a plurality of users 104 or the users may obtain the items from other services, as discussed in further detail below.

As illustrated, the environment 100 includes the plurality of users 104, each of which has or is associated with an electronic book reader 106 (also referred to herein as an electronic reader). Although FIG. 1 illustrates three electronic readers 106, the described techniques can be used with any number of users and electronic book readers. In addition, a single user 104 may use a plurality of electronic book readers 106.

In this example, each electronic reader 106 has a display upon which electronic content such as electronic books (eBooks) may be rendered. FIG. 1, for instance, illustrates one reader rendering a first version 108(1) of the electronic book "Pride and Prejudice," while a second reader renders a second version 108(2) of the same book. The terms content, content item, and "eBook" include essentially any form of electronic data that may be consumed on a device, including textual and verbal works comprising sequences of words such as digital books, audio books, electronic magazines, papers, journals, periodicals, documents, instructional materials, course content, music, movies, and so on. In other examples, the users may employ electronic devices that do not include a display, but rather include speakers or another output device for outputting audio or the like.

In addition, note that for purposes of explanation, the term "version" will be used herein to indicate a specific revision and format of an electronic content item. Thus, two different "versions" of an electronic content item may vary from each other by content and/or by format. As an example, two different versions of an eBook may be formatted using the same eBook format, but may have slightly different words or text. Alternatively, two different versions may have identical textual content, but may be formatted in two different eBook formats. For example, one version may be text-based, while another version may be audio-based. As another example, two different versions may comprise the same eBook in different languages. As yet another example, two versions of an eBook may have the same content, but because they are from different publishers, the words of the versions may align different to a byte index or other position index.

The electronic readers 106 of FIG. 1, meanwhile, may be handheld devices or other small, light-weight, portable devices upon which eBooks and other content can be rendered and conveniently viewed in a manner similar to viewing a paper book. Examples of handheld electronic readers include flat form-factor devices such as tablets, pads, smartphones, personal digital assistants (PDAs), etc.

In some embodiments, the electronic readers 106 may comprise dedicated-purpose eBook reader devices, having flat-panel displays and other characteristics that mimic the look, feel, and experience offered by paper-based books. For example, such eBook reader devices may have high-contrast flat-panel displays that appear similar to a printed page and that persist without frequent refreshing. Such displays may consume very negligible amounts of power, so that the eBook reader devices may be used for long periods without recharging or replacing batteries. In some instances, these readers may employ electrophoretic displays.

In the example of FIG. 1, the electronic readers 106 have networking capabilities. For example, the electronic readers 106 may have wireless communication interfaces that allow communication though a network 110. The wireless communications interfaces may utilize WiFi, cellular, or other wireless data and networking technologies. The network 110 may be any type of communication network, including a local-area network, a wide-area network, the Internet, a wireless network, a wide-area network (WWAN), a cable television network, a telephone network, a cellular communications network, combinations of the foregoing, etc.

In the described embodiment, the electronic readers 106 include non-volatile storage capabilities so that electronic content items can be downloaded and stored in their entirety on the electronic readers. In some instances, once an eBook has been stored by an electronic reader, it can be displayed and read at any time, whether or not the electronic reader is connected to a network. In other embodiments, meanwhile, the reader may stream or otherwise receive content items on-demand.

In the configuration illustrated by FIG. 1, the electronic readers 106 may obtain content items from the content item alignment service 102 and/or from any other service. The service 102 and other services may be accessed using the networking capabilities of the electronic readers 106. The service 102 and the other services may be accessible through other means as well, such as by connection to intermediary devices like personal computers, different types of mobile devices, and so forth.

In FIG. 1, the content item alignment service 102 is illustrated as a network-based or cloud-based service, available over a public network such as the Internet. The electronic readers 106 may be configured to allow the users 104 to conveniently browse for content and content items from the service 102, and to purchase and download selected content items from the service 102.

Various applications and user interfaces may be used in conjunction with the electronic readers 106 to interact with the service 102, such as Internet browser programs that allow a user to interactively engage different online services. In addition, the service 102 may expose lower-level interfaces or APIs (application programming interfaces) through the network 110, through which devices and programs can access the underlying functionality of the service 102 without direct user interaction. For example a user may interactively purchase an eBook or other content item using a personal computer or some device other than the electronic reader device 106. The electronic reader 106 may periodically communicate with the service 102 to perform background synchronization or other housekeeping, and may automatically (without specific user intervention) download any content that has been purchased.

The service 102 might be implemented in some embodiments by an online merchant or vendor. Electronic books and other electronic content might be offered for sale by such an online merchant, or might be available to members or subscribers for some type of periodic or one-time fee. In some circumstances, eBooks or other content might be made available without charge. In either instance, the service 102 may include a client interface through which electronic readers 106 and other clients interact with the service 102. The client interface may include a virtual storefront or other type of online interface for interaction with consumers and/or devices. The client interface may expose a graphical, web-based user interface that can be accessed by human users to browse and obtain (e.g., purchase, rent, lease, etc.) content items such as eBooks. The client interface may also expose programmatic interfaces or APIs that entities and devices can use to obtain digital content items and related services. As discussed above, in the illustrated example the two example users may have utilized the web-based user interface or the APIs to obtain the first and second versions 108(1) and 108(2) of "Pride and Prejudice."

When the content item alignment service 102 receives a new version of a content item, such as an electronic book, the service 102 may attempt to align this new version with one or more previous versions of the book. FIG. 1, for instance, illustrates that the content item alignment service 102 has attempted to align the first version 108(1) of "Pride and Prejudice" with the second version 108(2), as illustrated by alignment 112.

The alignment 112 illustrates that the first version 108(1) begins with the sentence "It is a truth universally acknowledged, that a single man in possession . . . ", while the second version begins with the sentence "It is a truth that's universally acknowledged, that a single man in possession . . . " In the illustration, the alignment 112 also includes arrows between the matching and corresponding words of the two versions of the eBook. In addition, the alignment 112 indicates that the word "that's" found in the second version 108(2) does not have a corresponding match in the first version 108(1). Manual inspection of the two sentences will confirm this absence.

By aligning the first version 108(1) of "Pride and Prejudice" with the second version 108(2), the content item alignment service 102 is able to identify the differences between these versions. The service 102 and/or other entities may use this knowledge in a variety of ways. For instance, the service 102 may simply desire to document the updates that occur with different versions of a book. Additionally or alternatively, the service 102 may desire to understand the differences to allow objects (e.g., annotations, illustrations, etc.) that are associated with one version of the book to map appropriately to another version.

For instance, if a user consuming the second version 108(2) creates an annotation in association with the extraneous "that's", then the service 102 may understand that this annotation should map in between the words "truth" and "universally" in the first version 108(1) of the book. In another example, if a publisher or other entity has associated an illustration with a particular set of words of the first version 108(1) of the book, then the alignment 112 may allow the service 102 to map this illustration over to the second version 108(2) in the appropriate location. Of course, while a few examples have been listed, it is to be appreciated that the alignment 112 between the first version 108(1) and the second version 108(2) may be helpful to the service 102, the users 104, and/or other entities in many other ways.

Example Alignment

Figure 2:
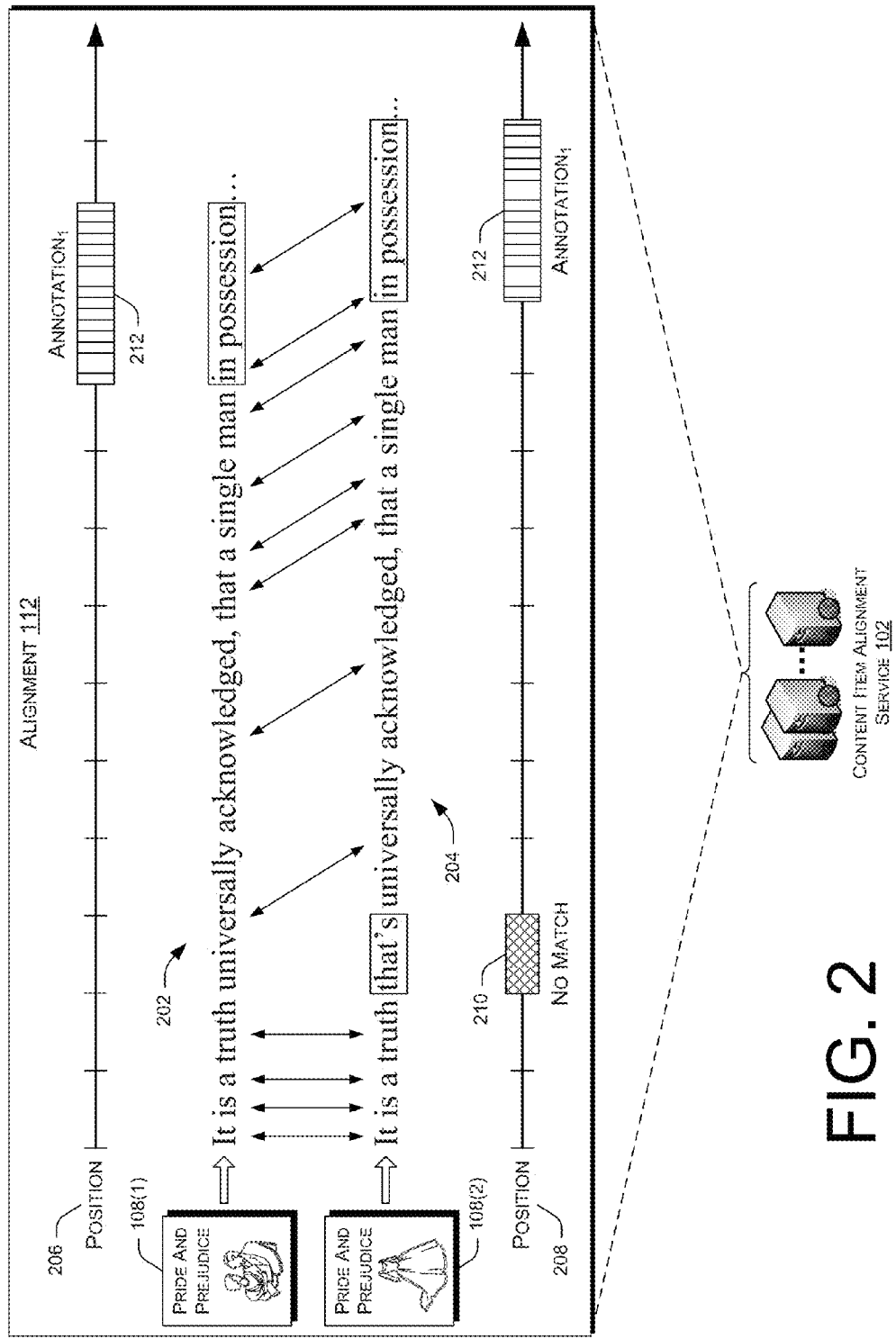
FIG. 2 illustrates the alignment of the different versions of the electronic book from FIG. 1 in greater detail.

FIG. 2 illustrates the alignment of the different versions of the electronic book from FIG. 1 in greater detail. As illustrated, the example alignment 112 illustrates text 202 of the first version 108(1) of the book as aligned with text 204 from the second version 108(2). FIG. 2 further illustrates that words of the text 202 of the first version 108(1) are associated with respective positions on an example position line 206, while words of the text 204 of the second version 108(1) are associated with respective positions on an example position line 208. By aligning the versions of the eBook in this manner, differences between the versions may be identified. In addition, word positions between the different versions may be identified, thus allowing annotations and other objects (e.g., illustrations, etc.) that are associated with particular words in one version to correctly map to the other version.

The locations or positions within a particular content item can be indicated in different ways, and different eBook formats often use different metrics to indicate position. In paper-based books, location is usually indicated by page number, and possibly by a line number relative to a page. In eBooks, however, page boundaries are generally undefined, and page divisions vary based on the rendering capabilities and/or settings of the device upon which the eBooks are being rendered. Accordingly, some eBook formats may indicate position in terms of a character index, such as the number of characters from the beginning of the eBook, or in terms of a byte index, such as the number of bytes from the beginning of the eBook. Other eBook formats may indicate position in terms of a word index, such as the number of words from the beginning of the eBook. Other measurement quantities can also be used, such as a sentence index, a line index, or a paragraph index. In audio eBooks, location or position may be indicated by a time index—the length of elapsed time from the beginning of an audio eBook. In some instances, these measurement quantities comprise invariant reference locators that do not changes with display conditions, as described in U.S. patent application Ser. No. 11/693,677, filed on Mar. 29, 2007 and entitled "Invariant Referencing in Digital Works," which is herein incorporated by reference in its entirety.

Different versions of a particular eBook can have discrepancies in location indexing, even within a single eBook format. In particular, the addition, deletion, or modification of words, characters, sentences, and paragraphs between versions of an eBook may result in the same word or passage having different position indexes within the respective versions. FIG. 2, for instance, illustrates that the word "that's" appears in the second version 108(2) of the eBook, but not within the first version 108(1). FIG. 2 thus illustrates that the position of the word "that's" on the position line 208 includes an indication 210 that this word does not have a match in the other version 108(1) of the eBook. In addition to identifying this difference between the two version of the eBook, the alignment 112 shows that the word "universally" in the first version 108(1) has a position that is different from this word's position in the second version 108(2) due the extraneous use of "that's" in the second version 108(2).

By aligning the text 202 of the first version 108(1) with the text 204 of the second version 108(2) in this manner, the example alignment 112 allows for objects (e.g., annotations, illustrations, etc.) that are associated with particular words in the eBook to map correctly between the different versions of the eBook. Such annotations may include highlights, underlining, comments, ratings, tags, corrections, and other items of information relating to specific locations within the electronic content. The annotations can be stored locally on the electronic readers, or may be stored remotely. FIG. 2 illustrates that an annotation 212 is associated with the words "in possession." Due to the aligning of these particular words between the different versions of the eBook, the position lines 206 and 208 include indications of this annotation 212 at different locations, each properly associated with the words "in possession."

Example Alignment Processes

Figure 3:
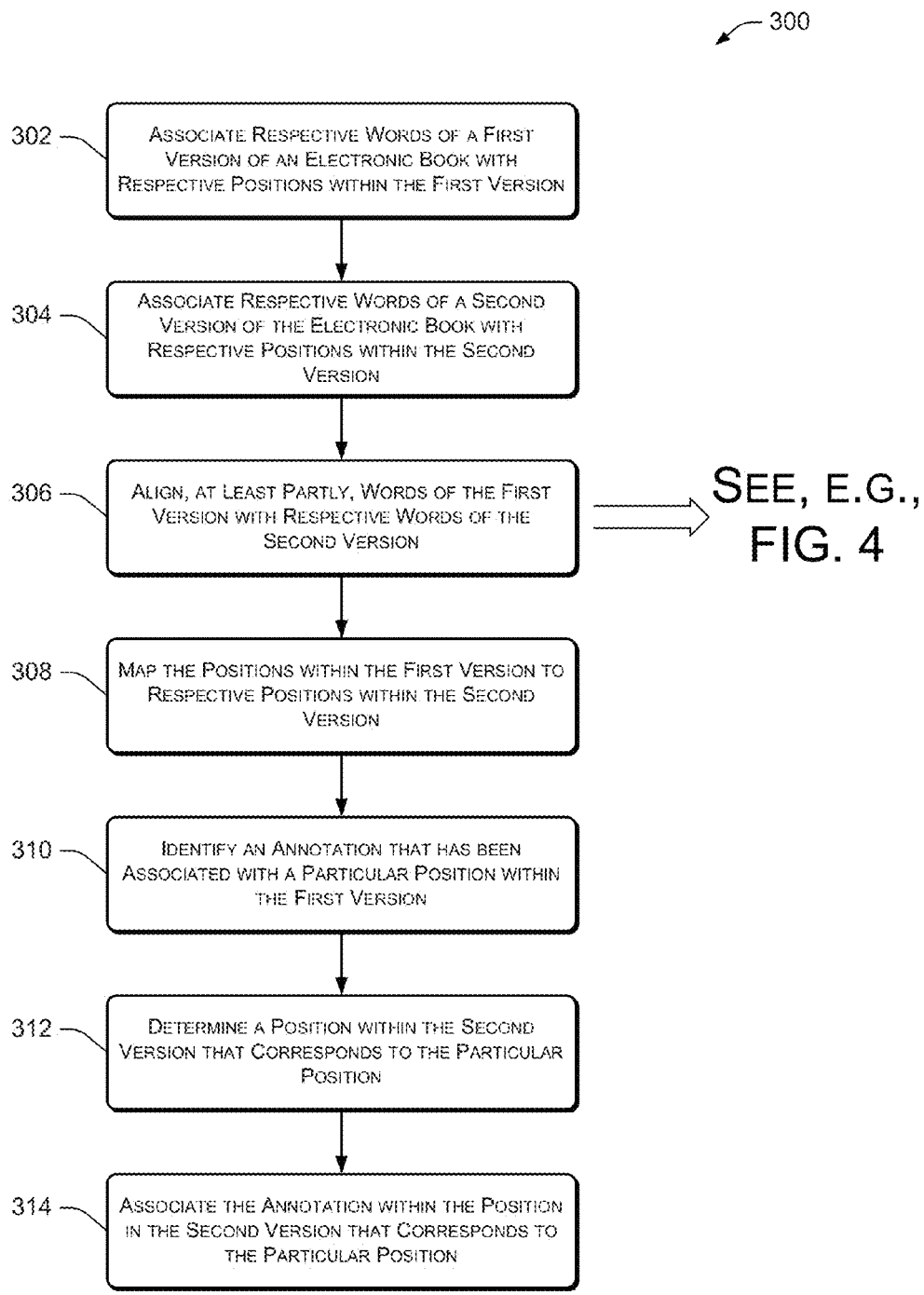
FIG. 3 is a flow diagram of an illustrative process that includes aligning different versions of an electronic book, as well as mapping annotations made in one version to the other version based on the aligning.

FIG. 3 is a flow diagram of an illustrative process 300 that includes aligning different versions of an electronic book, as well as mapping annotations made in one version to the other version based on the aligning. Each of the processes described herein is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 302, the content item alignment service 102, a publisher, an eBook retailer or another entity associates respective words of a first version of an eBook with respective positions within the first version of the eBook. For instance, the service 102 may associate words of the eBook with a byte count, a character index, or any other position metric. Further, punctuation and white spaces may also be mapped to respective positions in some instances, while in other instances they may not. At 304, the service 102 or other entity may associate respective words of a second version of the same eBook with respective positions within the second version.

The second version may be an updated or modified version of an existing version of a content item. It may thus differ from one or more existing versions of the same content item in terms of content, storage format, or both. Content differences between two versions of the same work may range from very minor to relatively significant. For example, differences may consist of mere spelling corrections. More significant differences may involve significant editing or the addition/deletion of entire phrases, sentences, paragraphs, chapters, introductory materials, afterwards, etc. Versions may also differ in format. For example, one version might be formatted as a PDF (portable document format) document, while another is formed as a MOBI (Mobipocket) file. Versions may also vary by language or media. Thus, one version might be in a different language than another version. As another example, one version might comprise a written or text-based eBook, while another version might comprise an audio performance of the same eBook.

At 306, the content alignment service 102 may then align, at least partly, the respective words of the first version of the electronic book with the respective words of the second version of the electronic book. While the alignment service 102 may align the versions in multiple different ways, FIG. 4 and a corresponding discussion depict one example alignment process. After aligning the different versions of the eBook, the service 102 may then map the respective positions within the first version of the eBook to the respective positions within the second version at 308.

After mapping positions within the first version to respective positions within the second version, objects (e.g., annotations, illustrations, etc.) may be mapped accurately between the versions. For instance, envision that a user that is reading the second version requests a particular set of annotations from a user who read and annotated the first version of the book. In response, the content alignment service 102 or another entity may identify one such annotation that has been associated with a particular position within the first version of the eBook at 310. The service 102 may then determine a position in the second version that corresponds to the particular position within the first version at 312. At 314, the service 102 may then associate the annotation with the position in the second version at least partly based on the determining. Further, the service 102 may provide this annotation to the electronic reader of the requesting user that is reading the second version of the book for rendering at the proper position within the second version.

Figure 4:
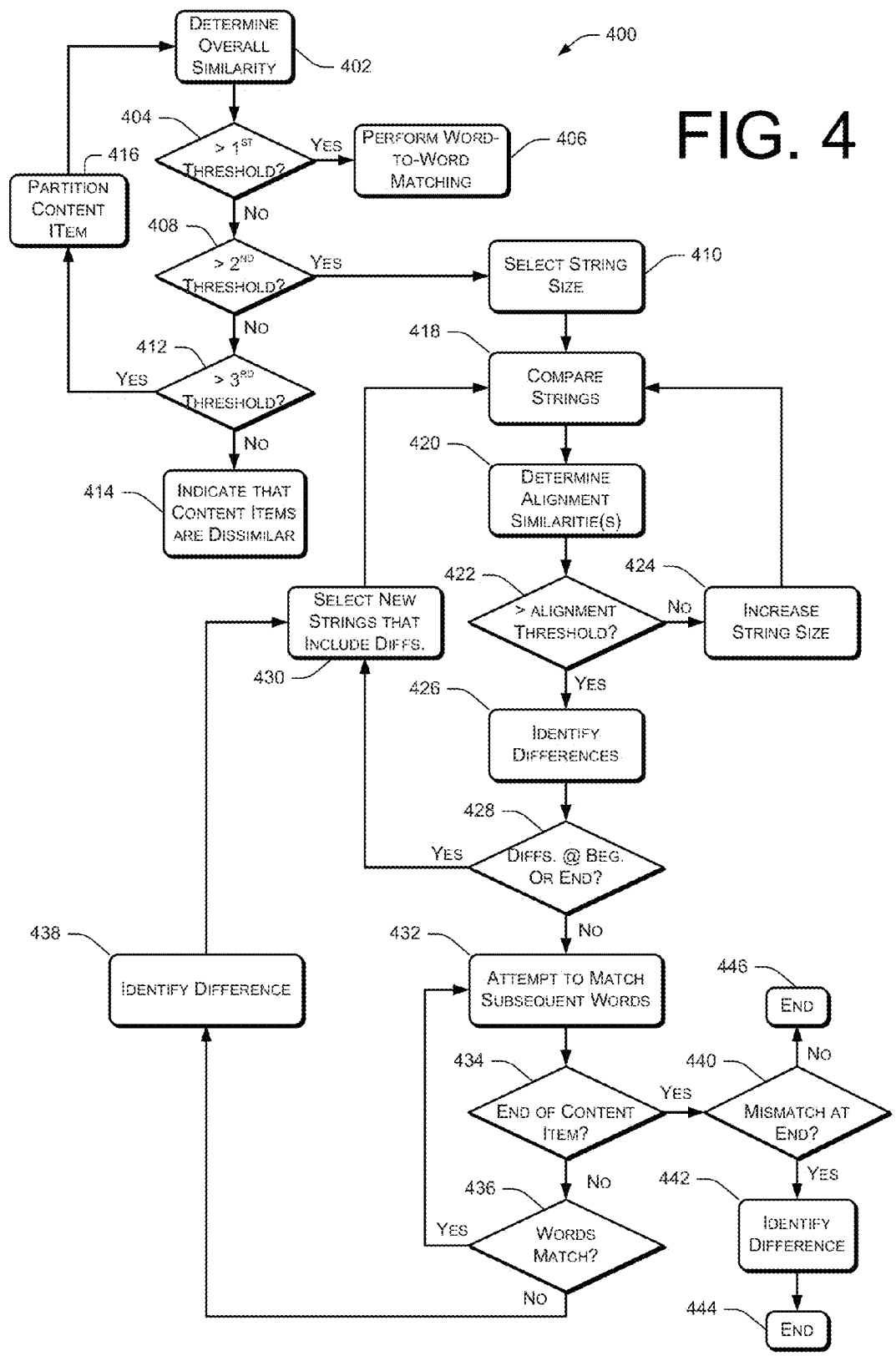
FIG. 4 is a flow diagram of one illustrative process for achieving the aligning of FIG. 3.

FIG. 4 is a flow diagram of one illustrative process for achieving the aligning described at 306 of FIG. 3. The content item alignment service 102 may perform the process 400, in whole or in part, in some instances.

At 402, the service 102 may first determine an overall similarity between two content items, such as the example two versions of the same eBook. The overall similarity may be determined in a number of ways, such as by comparing a total size of the content items, a number of words in the content items, a length of the content items, or in any other suitable manner. In one example, the service 102 determines the overall similarity with reference to a frequency of each word within each content item, as described below.

Using this technique, the service 102 may first count the number of times that each word within each content item is used, as well as differences in usage there between. For example, the service may tabulate the following:

TABLE 1

| First Content Item | Second Content Item | Difference (absolute) |
| --- | --- | --- |
| $Word_1$ = 10 uses | $Word_1$ = 10 uses | 0 |
| $Word_2$ = 12 uses | $Word_2$ = 11 uses | 1 |
| $Word_3$ = 7 uses | $Word_3$ = 9 uses | 2 |
| * * * | * * * | * * * |
| $Word_n$ = 9 uses | $Word_n$ = 9 uses | 0 |

After tabulating this count, the service 102 may then sum the raw difference between the two content items. In some instances, this difference may include summing the total difference from the right column above, along with the number of words (and uses thereof) in the first content item that do not appear in the second content item, and vice versa. In this example, assume that the only differences between the content items appear in Table 1 above. As such, the raw difference in this example is equal to 3.

The service 102 may then calculate the union of the common word count across the two different content items and the summed difference, as follows:

$$Union = common\ count + summed\ difference \quad (1)$$

Here, the union is equal to 40 (10 common uses of $word_1$ + 11 common uses of $word_2$ + 7 common uses of $word_3$ + 9 common uses of $word_n$ + the summed difference of 3). Next, the service may calculate the normalized symmetric distance as follows:

$$Symmetric\ Distance_{norm} = Raw\ Difference/Union \quad (2)$$

Here, the normalized symmetric distance is equal to 3/40. Finally, the service may determine the overall similarity between the content items with reference to equation (3):

$$Similarity_{overall} = (1 - Symmetric\ Distance_{norm}) * 100 \quad (3)$$

Here, the overall similarity is equal to (1−3/40)*100, or 92.5%.

After calculating the overall similarity in this or in any other manner, the service 102 may determine whether this determined overall similarity is greater than a first threshold at 404. In some instances, this threshold is set as a relatively high threshold so as to identify different versions of a same content item that are nearly identical to one another.

If the determined overall similarity is indeed greater than the first threshold, then the service 102 may proceed straight to performing word-to-word matching at 406. That is, the service 102 may begin to attempt to match a first word of the first content item with a first word of the second content item, and so forth. Although not illustrated, the process 400 may identify any mismatching words and, upon identifying a mismatch, the process 400 may proceed to some or all of the techniques 432-446.

If, however, the determined overall similarity is less than the first threshold, then the service 102 may determine whether the overall similarity is greater than a second threshold at 408. If so, the content item alignment service 102 may select a portion size of the first content item to compare to a corresponding portion of the second content item at 410. For instance, when comparing two different versions of an eBook, the service 102 may select a size of a string of words to compare. For example, the service 102 may choose to compare the first 100 words of the first version of the eBook with the first 100 words of the second version. In some instances, the size decreases inversely proportionally to the similarity. That is, the selected size may be small for content items that have a high degree of similarity, and vice versa.

If the determined overall similarity is less than the first and second thresholds, meanwhile, then at 412 the service 102 determines if the determined overall similarity is greater than a third threshold. If it is not, then the service 102 may indicate at 414 that the content items are dissimilar from one another and the process 400 may end.

If the determined overall similarity is greater than the third threshold, however, then the content service may partition the content items into discrete sections at 416 and may restart the process for these sections. For instance, envision that the content item alignment service 102 is attempting to align a microbiology textbook with a biology textbook that shares a chapter with the microbiology textbook. By partitioning the content items into chapters and running the chapters through the alignment process, the service 102 may identify the similar chapters and may attempt to align these similar chapters to identify differences there between. Conversely, the overall similarities between the remaining chapters will likely be so low so as to cause the service 102 to indicate that these chapters as dissimilar from one another.

Returning to the instances where the overall similarity is less than the first threshold but greater than the second threshold, the service 102 may initially select a string of words from the first content item and a string of words of the second content item to compare with one another at 410. After doing so, at 418, the service 102 may attempt to align these two strings of words. In some instances, the service 102 may attempt to align the strings using a global alignment algorithm (e.g. the Needleman-Wunsch algorithm) or a local alignment algorithm (e.g., the Smith-Waterman algorithm). After attempting to align these strings in one or more ways, the service 102 may determine an alignment similarity for each alignment at 420.

After determining the alignment similarities, the content item alignment service 102 may select an alignment for analysis. At 422, the service 102 may determine whether the alignment similarity for this alignment is greater than a predefined alignment threshold. If not, then the service 102 may increase the size of the string at 424 and may again attempt to align the strings. In some instances, the new strings include the original string as well as some number of additional words.

If, however, the alignment similarity is greater than the threshold, then service 102 may proceed to identify differences between the words within the strings at 426. For instance, the service 102 may perform word-to-word matching between the words within the strings and may identify and store these differences. In some embodiments, the service 102 may refrain from attempting to identify differences within the strings other than at the beginning or end of the strings. That is, the service 102 may only attempt to identify whether any differences exist at the beginning or the end of the strings and may refrain from making any such determinations within the body of the strings. In either instance, at 428, the service 102 may determine whether any of the identified differences between the strings are at the beginning and/or the end of the strings. If so, then at 430 the service 102 may select new, expanded strings that include these differences and may attempt to align these new strings. If, however, no differences exist at the end of the strings, then the service 102 may attempt to match words that are subsequent to the strings at 432. For instance, after comparing 100 words of a first version of an eBook with 100 words of the second version, and after finding no differences between the first and the $100^{th}$ word of these strings, the service 102 may proceed to attempt to compare the 101$^{st}$ word of the first version with the 101$^{st}$ word of the second version. In some instances, meanwhile, the process may attempt to match words in this manner even if a difference exists at the end of the strings.

First, however, the service 102 determines, at 434, whether it has reached the end of one or both of the content items. If not (e.g., if there is a 101$^{st}$ word in each version of the example eBook), then the service 102 determines whether the words match at 338. If the words match, then at 436 the service 102 proceeds to attempt to match a subsequent word—such as the 102$^{nd}$ word of each of the versions of the eBook, and so forth. If, however, the words do not match, then the content item alignment service 102 identifies and logs this difference between the content items at 438 and the process 400 loops back to select a new string (including the identified difference) at 430. After selecting a new string of words in each of the content items, the service then compares the new strings at 418 as discussed above.

Returning to 434, when the service 102 reaches the end of one or both of the content items, the service 102 determines whether there is a mismatch at the end at 440. For instance, if one version of the example eBook includes a 101$^{st}$ word but the second version does not, the service 102 would identify this mismatch and identify the difference between the versions at 442. The process then ends at 444. If, however, no mismatch is found at the end of the book, then process 400 simply ends at 446.

At the conclusion of the process 400, the content item alignment service 102 will likely have successfully aligned the different content items—such as the different versions of "Pride and Prejudice." Furthermore, the service 102 will likely have identified the differences there between.

Example Server

Figure 5:
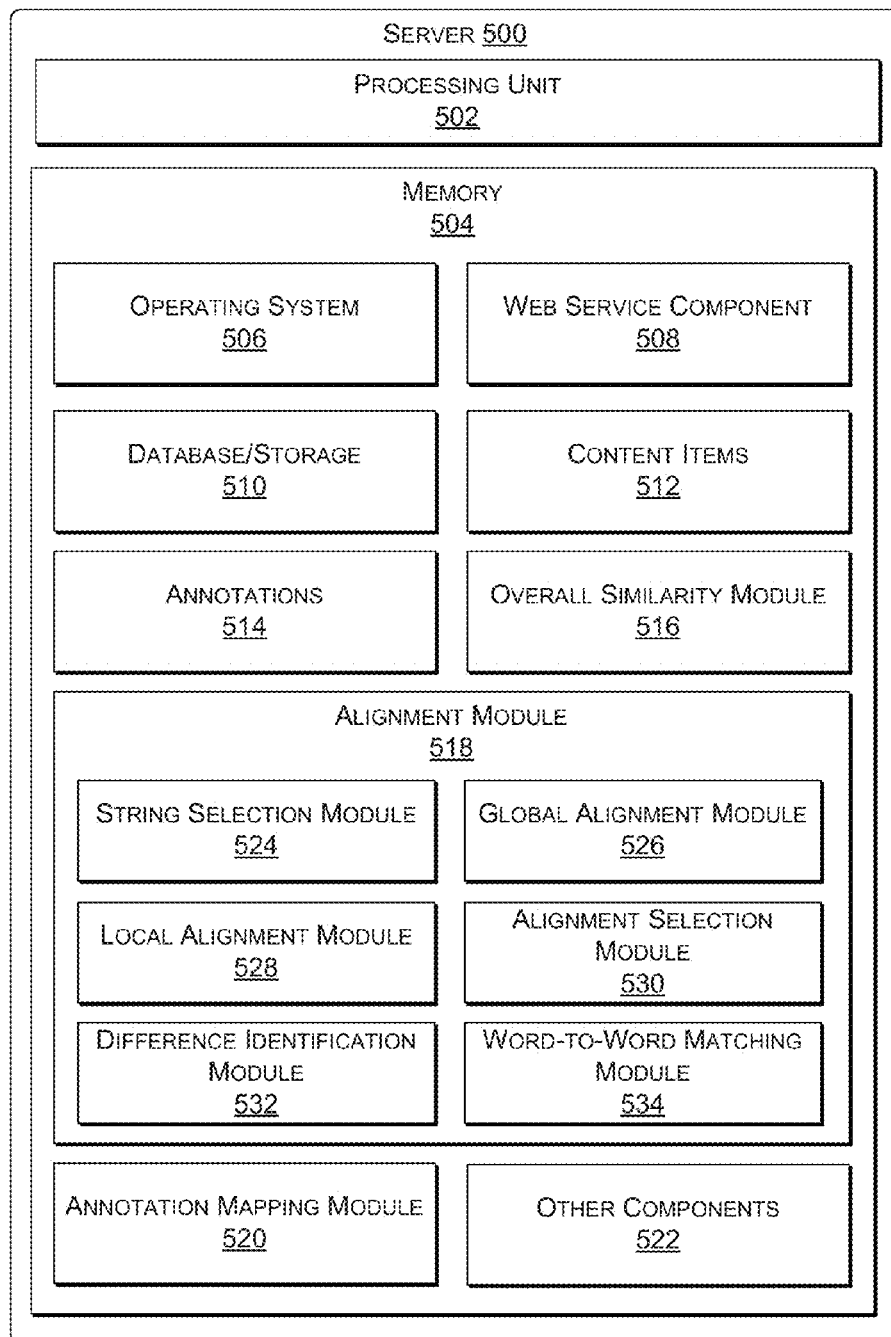
FIG. 5 is a block diagram illustrating components of a server of the content item alignment service of FIG. 1 that may be used to implement some of the techniques described herein.

FIG. 5 is a block diagram illustrating components of a server of the content item alignment service 102 of FIG. 1 that may be used to implement some of the techniques described herein. Generally, the service 102 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 500 may comprise a processing unit 502 composed of one or more processors, and memory 504. Depending on the configuration of the server 500, the memory 504 may be a type of computer storage media and may include volatile and nonvolatile memory. Thus, the memory 504 may include, but is not limited to, RAM, ROM, EEPROM, flash memory, or other memory technology.

The memory 504 may be used to store any number of functional components that are executable by the processing unit 502, as discussed below. In many embodiments, these functional components comprise instructions or programs that are executable by the processing unit 502, and that when executed implement operational logic for performing the actions attributed above to the content item alignment service 102. In addition, the memory 504 may store various types of data that are referenced by executable programs, including content items that are supplied to consuming devices such as the electronic readers 106.

Functional components stored in the memory 504 may include an operating system 506 and a web service component 508 that interacts with remote devices such as computers and media consumption devices. The memory 504 may also include database 510 to store content items 512, annotations 514, etc. In addition, the memory 504 may store an overall similarity module 516, which may function to determine an overall similarity between two or more content items, as discussed above.

The functional components may also include an alignment module 518 and an annotation mapping module 520. The alignment module 518 functions to create an alignment between two or more content items, such as the example alignment 112 between the two different versions of the eBook "Pride and Prejudice." The annotation mapping module 520, meanwhile, functions to accurately map annotations between different versions of a same content item after the alignment module 518 has aligned these versions. Finally, the server 500 may of course include many other logical, programmatic, and physical components, generally referenced by numeral 522, of which those described above are merely examples that are related to the discussion herein.

Returning the alignment module 518, this module may itself include a string selection module 524, a global alignment module 526, a local alignment module 528, an alignment selection module 530, a difference identification module 532, and a word-to-word matching module 534. The string selection module 524 functions to select a string of words from two or more different content items for comparison, possibly based at least in part upon the overall similarity of the content items as discussed above. The global and local alignment modules 526 and 528, meanwhile, function to attempt to align the selected string globally or locally, respectively, using any of the algorithms discussed above. After these modules create one or more potential alignments, the alignment selection module 530 may select an alignment. The difference identification module 532 then identifies any differences within the strings (as well as whether any differences exist at the beginning or the end). Finally, the word-to-word matching module 534 functions to attempt to match words subsequent to the strings after the strings have been successfully aligned.

Example Electronic Reader

Figure 6:
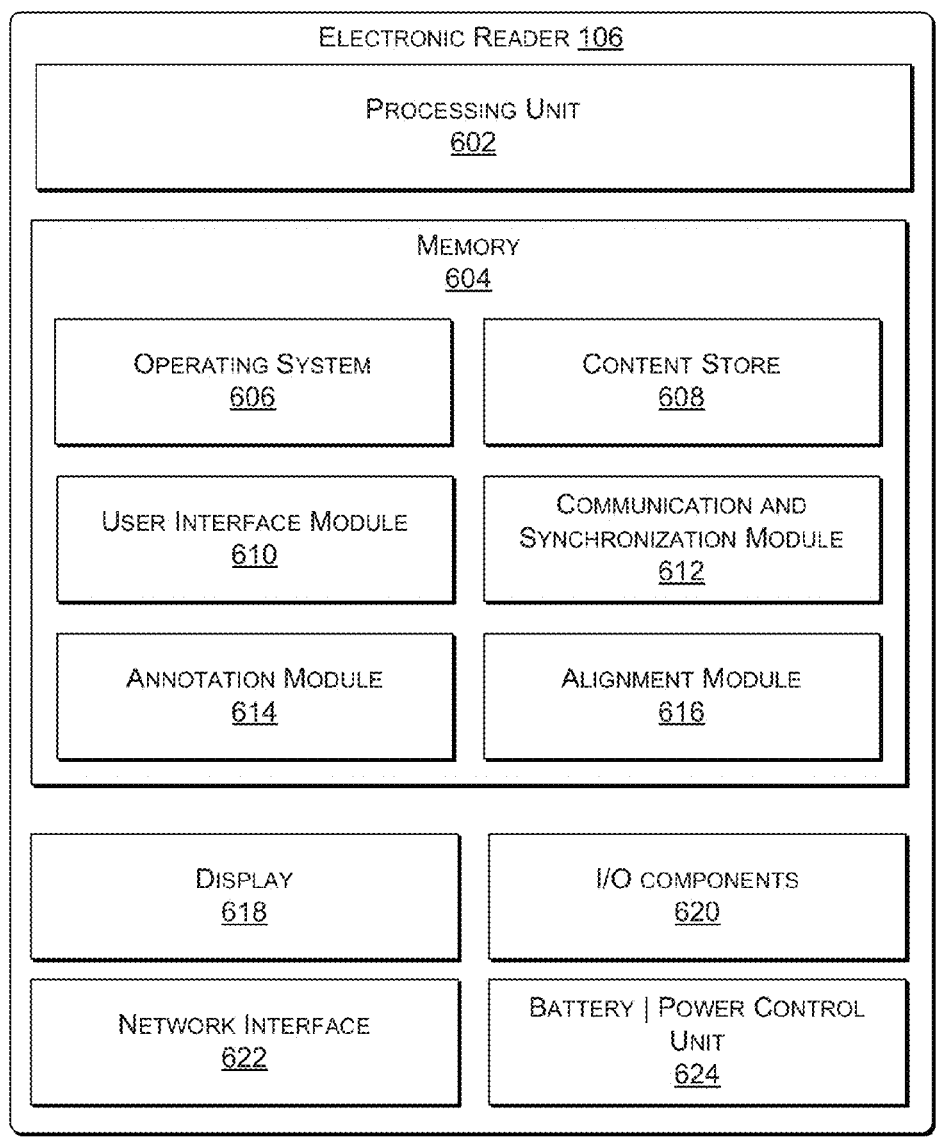
FIG. 6 is a block diagram illustrating components of an electronic book reader device that may be used in conjunction with the techniques described herein.

FIG. 6 is a high-level block diagram showing an example of the electronic reader 106, indicating components that are relevant to this discussion. In this embodiment, the electronic reader 106 is a dedicated eBook reader device, designed specifically for the purpose of emulating a traditional book-like reading experience. To that end, it is has a size and weight that is comparable to a paper-based book, and uses a monochrome display having a contrast ratio that approaches that of the printed page.

In a very basic configuration, the electronic reader 106 includes a processing unit 602 composed of one or more processors, and memory 604. Depending on the configuration of the eBook reader 106, the memory 604 may be a type of computer storage media and may include volatile and non-volatile memory. Thus, the memory 604 may include, but is not limited to, RAM, ROM, EEPROM, flash memory, or other memory technology, or any other medium which can be used to store media items or applications and data which can be accessed by the electronic reader 106.

The memory 604 may be used to store any number of functional components that are executable on the processing unit 602. In many embodiments, these functional components comprise instructions or programs that are executable by the processing unit 602 and that implement operational logic for performing the actions attributed above to the electronic reader 106. In addition, the memory 604 may store various types of data that are referenced by executable programs.

The memory 604 may store an operating system 606 and a content store 608 to store one or more content items, annotations, and the like. A user interface (UI) module 610 may also be provided in the memory 604 and executed on the processing unit 602 to provide for user operation of the electronic reader 106. The UI module 610 may provide menus and other navigational tools to facilitate selection and rendering of content items. The UI module 610 may further include a browser or other application that facilitates access to sites over a network, such as websites or online merchants, or other sources of electronic content items or other products.

A communication and synchronization module 612 is stored in the memory 604 and executed on the processing unit 602 to perform management functions in conjunction with one or more content sources, such as the content service 108 discussed above. In some embodiments, the communication and synchronization module 612 communicates with the content service 108 to receive eBooks and other content items.

The electronic reader 106 may also include an annotation module 614 allowing a user to enter annotations, as discussed above. In addition, the electronic reader 106 may optionally include an alignment module 616 that includes some or all of the functionality described above with reference to the alignment module 518. The electronic reader 106 may additionally or alternatively store any of the other modules discussed above with reference to the example server 500 of the content item alignment service 102, such as the overall similarity module 516 and/or the annotation mapping module 520. Further, the alignment module 518 and/or any of the other modules may be additionally or alternatively be stored and executed at any other number of client and/or server devices.

The electronic reader 106 may further include a display 618 upon which electronic books are rendered. In one implementation, the display 618 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The electronic reader 106 may further be equipped with various input/output (I/O) components 620. Such components may include various user interface controls (e.g., buttons, joystick, keyboard, etc.), audio speaker, connection ports, and so forth.

A network interface 622 may support both wired and wireless connection to various networks, such as cellular networks, radio, WiFi networks, short range networks (e.g., Bluetooth), IR, and so forth. The network interface 622 facilitates receiving electronic books and other content as described herein.

The electronic reader 106 may also include a battery and power control unit 624. The power control unit operatively controls an amount of power, or electrical energy, consumed by the electronic reader. Actively controlling the amount of power consumed by the electronic reader may achieve more efficient use of electrical energy stored by the battery.

The electronic reader 106 may have additional features or functionality. For example, the electronic reader 106 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Conclusion

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. One or more non-transitory computer-readable media storing computer-executable instructions that, when executed, cause one or more processors to perform acts comprising:

determining an overall similarity between a first electronic book and a second electronic book;

determining that the overall similarity is less than a first overall similarity threshold and greater than a second overall similarity threshold;

selecting a first string of words of the first electronic book and a second string of words of the second electronic book;

comparing the first string of words to the second string of words;

determining that a similarity in alignment between the first string of words and the second string of words is greater than an alignment threshold based at least in part on the comparing;

selecting a third string of words of the first electronic book at a predetermined location relative to the first string of words;

identifying a fourth string of words of the second electronic book at the predetermined location relative to the second string of words;

determining a similarity metric between the third string of words and the fourth string of words; and performing word-to-word matching between the third string of words and the fourth string of words, based at least in part on the similarity metric being greater than a predetermined threshold.

2. One or more non-transitory computer-readable media as recited in claim 1, the acts further comprising:
determining that no difference exists between a word at an end of the first string of words and a word at an end of the second string of words; and
wherein the performing of the word-to-word matching occurs at least partly in response to determining that no difference exists between the word at the end of the first string of words and the word at the end of the second string of words.

3. One or more non-transitory computer-readable media as recited in claim 1, the acts further comprising:
determining that a difference does exist between a word at the end of the first string of words and a word at the end of the second string of words;
selecting a different string of words of the first electronic book and a different string of words of the second electronic book, at least one of the different strings of words including the determined difference;
comparing the different string of words of the first electronic book to the different string of words of the second electronic book; and
determining a similarity in alignment between the different string of words of the first electronic book and the different string of words of the second electronic book based at least in part on the comparing.

4. One or more non-transitory computer-readable media as recited in claim 1, the acts further comprising:
at least partly in response to determining that the overall similarity is greater than the first overall similarity threshold, performing word-to-word matching between words of the first electronic book and words of the second electronic book.

5. One or more non-transitory computer-readable media as recited in claim 1, wherein a size of strings of words of the first and second electronic books is selected based at least in part on the overall similarity.

6. One or more non-transitory computer-readable media as recited in claim 1, the acts further comprising:
at least partly in response to determining that the overall similarity is less than the first and second overall similarity thresholds but greater than a third overall similarity threshold, partitioning the first and second electronic books into multiple discrete portions and repeating the determining of the overall similarity for each of the multiple discrete portions; and
at least partly in response to determining that the overall similarity is less than the first, second, and third overall similarity thresholds, indicating that the first and second electronic books are dissimilar.

7. One or more non-transitory computer-readable media as recited in claim 1, wherein the first electronic book comprises a first version of a particular book and the second electronic book comprises a second version of the particular book.

8. A method comprising:
under control of one or more computer systems configured with specific executable instructions,
associating a first string of words of a first version of an electronic book with a first position within the first version of the electronic book;
identifying a second string of words of a second version of the electronic book that correspond to the first string of words of the first version of the electronic book;
associating the second string of words of the second version of the electronic book with a second position within the second version of the electronic book, wherein the first version of the electronic book is in a same electronic book format as the second version of the electronic book;
aligning the first string of words of the first version of the electronic book with the second position of the second string of words of the second version of the electronic book; and
mapping the second string of words of the second version of the electronic book to the first position within the first version of the electronic book based at least in part on the aligning.

9. The method as recited in claim 8, further comprising:
identifying an object associated with a particular position within the first version of the electronic book;
identifying, based at least in part on the mapping, a particular position within the second version of the electronic book that corresponds to the particular position within the first version of the electronic book; and
associating the object to the particular position within the second version of the electronic book.

10. The method as recited in claim 8, wherein the aligning comprises:
selecting the first string of words of the first version and the second string of words of the second version for comparison;
determining an alignment of the first string of words of the first version and the second string of words of the second version; and
in response to the alignment being greater than a threshold, matching at least some words of the first version that are subsequent to the first string of words of the first version with respective words that are subsequent to the second string of words of the second version.

11. The method as recited in claim 10, wherein the determining of the alignment comprises comparing the first string of words of the first version and the second string of words of the second version using an algorithm that is based at least in part on the Needleman-Wunsch algorithm or the Smith-Waterman algorithm.

12. The method as recited in claim 10, wherein in response to the matching at least some of the words of the first version with respective words of the second version comprises:
determining that a word of the first version that is immediately subsequent to the string of words of the first version does not match a word of the second version that is immediately subsequent to the string of words of the second version;
selecting a different string of words of the first version and a different string of words of the second version for comparison; and
determining an alignment of the different string of words of the first version and the different string of words of the second version.

13. The method as recited in claim 8, further comprising:
identifying differences between the first string of words of the first version of the electronic book and the corresponding second string of words of the second version of the electronic book; and
mapping the differences to the first position within the first version of the electronic book.

14. The method as recited in claim 8, further comprising:
identifying an annotation associated with the corresponding second string of words of the second version of the electronic book; and associating the annotation with the first position within the first version of the electronic book.

15. The method as recited in claim 8, further comprising: determining that the second version of the electronic book is in a different language to the first version of the electronic book; and wherein the aligning accounts for the different languages.

16. The method as recited in claim 8, further comprising: identifying punctuation and white space differences in the corresponding second string of words of the second version of the electronic book relative to the first string of words of the first version of the electronic book; and mapping the differences to the first position within the first version of the electronic book.

17. A method comprising:

under control of one or more computer systems configured with specific executable instructions, calculating an overall similarity between a first content item and a second content item;

aligning the first content item with the second content item based at least in part on the overall similarity being greater than a predetermined threshold;

identifying an annotation that has been associated with a particular position within the first content item by a user that previously accessed the first content item;

determining a position in the second content item that corresponds to the particular position within the first content item at least partly based on the aligning; and associating the annotation with the position in the second content item at least partly based on the determining.

18. The method as recited in claim 17, further comprising: determining that the first content item is an audio eBook; and wherein the corresponding particular position within the first content item is identified as a time index associated with the audio eBook.

19. The method as recited in claim 17, wherein the first content item comprises a first version of a particular book and the second content item comprises a second version of the particular book; and further comprising, determining that the second content item is in a different language to the first content item; and wherein the aligning accounts for the different languages.

20. A system comprising:

one or more processors;

memory;

one or more modules, stored in the memory and executable on the one or more processors to:

determine an overall similarity between a first electronic book and a second electronic book;

select a string of words of the first electronic book and a string of words of the second electronic book based at least in part on the overall similarity being less than a first overall similarity threshold and greater than a second overall similarity threshold;

determine a similarity in alignment for the string of words of the first electronic book and the string of words of the second electronic book;

at least partly in response to the similarity in alignment being greater than an alignment threshold, determine a similarity metric for words subsequent to the string of words of the first electronic book and words subsequent to the string of words of the second electronic book; and performing word-to-word matching between the words subsequent to the string of words of the first electronic book and the words subsequent to the string of words of the second electronic book, based at least in part on the similarity metric being greater than a predetermined threshold.

21. The system as recited in claim 20, wherein the one or more modules are further executable on the one or more processors to:

at least partly in response to the similarity in alignment being less than the threshold:

compare a different string of words of the first electronic book to a different string of words of the second electronic book; and determine a similarity in alignment between the different string of words of the first electronic book and the different string of words of the second electronic book.

22. The system as recited in claim 20, wherein the one or more modules are further executable on the one or more processors to:

identify differences between the string of words of the first electronic book and the string of words of the second electronic book based at least in part on the comparing.

23. The system as recited in claim 20, wherein the one or more modules are further executable on the one or more processors to:

determine that the word subsequent to the string of words of the first electronic book matches the word subsequent to the string of words of the second electronic book;

expand the string of words of the first electronic book to include the word subsequent to the string of words of the first electronic book;

expand the string of words of the second electronic book to include the word subsequent to the string of words of the second electronic book; and determine a similarity of a word subsequent to the expanded string of words of the first electronic book and a word subsequent to the expanded string of words of the second electronic book until a mismatch or an end of one of the electronic books is found.

24. The system as recited in claim 20, wherein the one or more modules are further executable on the one or more processors to:

at least partly in response to the word subsequent to the string of words of the first electronic book not matching the word subsequent to the string of words of the second electronic book:

compare a different string of words of the first electronic book to a different string of words of the second electronic book; and determine a similarity in alignment between the different string of words of the first electronic book and the different string of words of the second electronic book.

25. The system as recited in claim 20, wherein the one or more modules are further executable on the one or more processors to:

determine an alignment between the first electronic book and the second electronic book based at least in part on matching the word subsequent to the string of words of the first electronic book with the word subsequent to the string of words of the second electronic book;

determine that the first electronic book has an annotation that has been associated by a user with a particular position in the first electronic book; and associate the annotation with a corresponding position in the second electronic book based at least in part on the alignment between the first electronic book and the second electronic book.

26. The system as recited in claim 25, wherein the annotation comprises a comment, a highlight, or marking made by a user that previously accessed the first electronic book.

27. The system as recited in claim 25, wherein the particular position in the first electronic book and the corresponding position in the second electronic book comprise invariant reference locators.

28. The system as recited in claim 20, wherein the determining the similarity in alignment is performed with use of at least one of a global alignment algorithm or a local alignment algorithm.

* * * * *